July 30, 1929.   J. KAUTZ   1,722,924

SAW TOOTH SETTING DEVICE

Filed March 9, 1927

Jacob Kautz
INVENTOR

BY Victor J. Evans
ATTORNEY

Patented July 30, 1929.

1,722,924

UNITED STATES PATENT OFFICE.

JACOB KAUTZ, OF CHICAGO, ILLINOIS.

SAW-TOOTH-SETTING DEVICE.

Application filed March 9, 1927. Serial No. 174,017.

This invention relates to certain novel improvements in saw tooth setting devices and has for its principal object the provision of an improved construction of this character which will be highly efficient in use and economical in manufacture.

Among the salient objects of the invention is the provision of a device adaptable for manipulation on the teeth of a saw whereby to set the teeth at proper angle for cross grain sawing or the like.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a typical side elevational view of the invention;

Figures 1, 2, 3, 4:
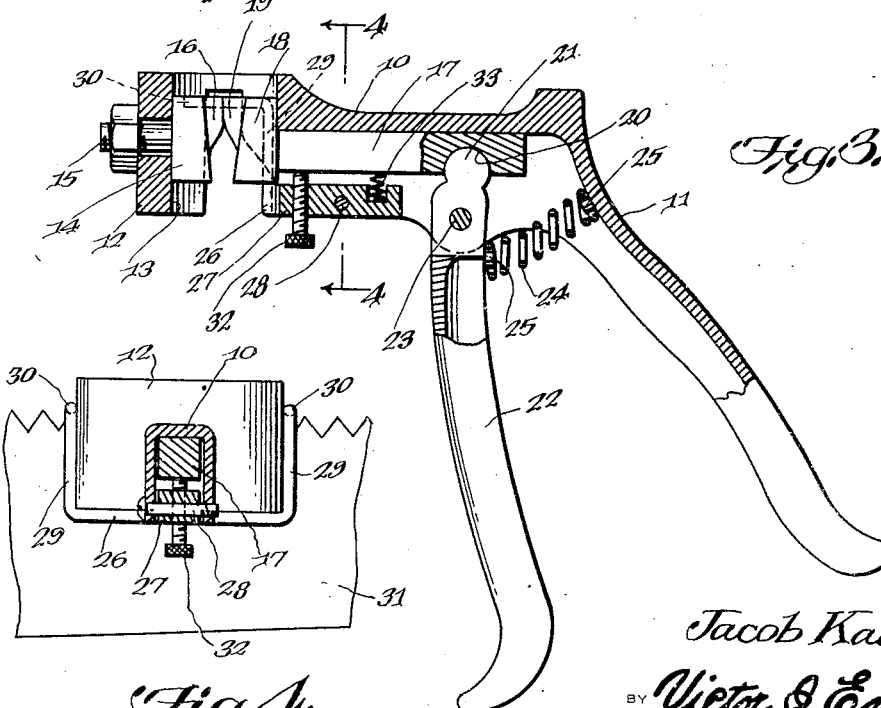
Fig. 2 is a fragmentary top plan view of the same.
Fig. 3 is a vertical sectional detail view of the same.
Fig. 4 is a sectional detail view taken substantially on line 4—4 of Fig. 3.

In the drawing, 10 indicates a body having a downwardly extending portion to provide a handle 11. The body 10 has a hollow interior and the forward end portion of the bottom provides a bearing head 12. This bearing head has a vertical opening 13 formed therein and arranged in this opening is a bending jaw 14. This jaw 14 is secured to one wall portion of the head 12 through the medium of a nut bearing stud 15 formed as an integral part of the jaw 14. The jaw 14 has a lip 16 formed therein for reasons hereinafter set forth.

Arranged in the body 10 is a shank 17 formed as an integral part of a bending jaw 18. This jaw 18 is arranged within the head 12 and has formed thereon a lip 19 adapted to cooperate with the lip 16 when in tooth bending operation, said lip 19 being movable relatively to the lip 16. This relative movement is accomplished in the following manner. Formed in the shank 17 is a spherical socket 20 and engaging in this socket 20 is a head 21 formed as an integral part of an operating handle 22. This operating handle 22 is pivotally connected to the body 10 through the medium of a pintle 23.

By moving the handle 22 relatively to the handle 11 the shank 17 will move relatively within the body 10 and move the jaw 18 into and from tooth setting position.

The jaw 18 is normally held from tooth setting position through the medium of a spring 24 disposed between the handles 11 and 22 and retained in position through the medium of studs 25, insertable in the ends of the spring 24.

Means is provided for limiting the position of the tooth bearing edge of the saw between the jaws and this means includes a member 26 formed from a length of wire and bent substantially U shaped. The member 26 is secured to an adjusting block 27 by welding or the like and this adjusting block is pivotally connected to the body 10 through the medium of a pintle 28.

The limb portions 29 of the member 26 have their end portions 30 bent on opposite sides transversely of the opening 13 in substantially a horizontal plane whereby when the tooth bearing edge of a saw 31 is inserted between the jaws the edge will engage the end portions 30 and be thereby properly positioned for operation upon by the jaws.

The end portions 30 are minutely adjusted through the medium of a set screw 32 carried by the block 27 and adapted to bear on the shank 17, said block 27 being normally urged in an upward pivotal movement through the medium of a spring 33 arranged between the shank 17 and block 27.

In use, the tooth bearing edge of the saw is arranged between the jaws 14 and 18. The handles 11 and 22 are firmly held in the hand and by applying pressure on the handle 22 this handle will pivot and urge the shank 17 to move the jaw 18 into tooth setting position. This movement of the jaw 18 brings the lip 19 into engagement with the tooth adjacent thereto and bends this tooth laterally of the body of the saw blade. During this movement the lip 16 will engage the tooth there-adjacent and bend said tooth in an opposite direction.

From this it will be seen that in one operation two teeth of the tooth bearing edge of the saw will be properly set for cross grain sawing or the like.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to secure by Letters Patent is:

In a saw tooth setting device, a stationary jaw, a movable jaw, cooperating lips formed on said jaws, means for moving said movable jaw toward said stationary jaw to bring said lips into cooperating relation, a block, means for rockably mounting said block on the member supporting said stationary jaw below said movable jaw, a substantially U-shaped member having the bight portion thereof secured to one end of said block and having the limb portions thereof bent along the sides of said jaws so as to be disposed substantially in horizontal alignment with the lips on said jaws, and means for urging said block about said rockable mounting whereby to urge the bent portions of said U-shaped member out of said aligned relation, and adjustable means for limiting said urging action.

In testimony whereof I affix my signature.

JACOB KAUTZ.